US009696840B2

(12) United States Patent
Xu

(10) Patent No.: US 9,696,840 B2
(45) Date of Patent: Jul. 4, 2017

(54) INFORMATION PROCESSING METHOD AND ELECTRONIC DEVICE

(71) Applicant: Lenovo (Beijing) Co., Ltd., Haidian District, Beijing (CN)

(72) Inventor: Ben Xu, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 45 days.

(21) Appl. No.: 14/974,842

(22) Filed: Dec. 18, 2015

(65) Prior Publication Data

US 2017/0075466 A1    Mar. 16, 2017

(30) Foreign Application Priority Data

Sep. 14, 2015    (CN) .......................... 2015 1 0583742

(51) Int. Cl.
  *G06F 3/041*    (2006.01)
  *G06F 1/16*    (2006.01)
  *G06F 3/0484*    (2013.01)

(52) U.S. Cl.
  CPC .......... *G06F 3/0414* (2013.01); *G06F 1/1652* (2013.01); *G06F 3/0418* (2013.01); *G06F 3/0484* (2013.01)

(58) Field of Classification Search
  CPC ...... G06F 3/016; G06F 3/0414; G06F 3/0484; G06F 3/147; G06F 1/1652; G06F 2203/014; G06F 2203/04102; G09G 2380/02
  See application file for complete search history.

(56) References Cited

U.S. PATENT DOCUMENTS

| | | | | |
|---|---|---|---|---|
| 7,456,823 B2 * | 11/2008 | Poupyrev | ................ | G06F 3/011 178/18.06 |
| 2010/0164888 A1 * | 7/2010 | Okumura | .............. | G06F 1/1626 345/173 |
| 2011/0057873 A1 * | 3/2011 | Geissler | ................ | G06F 1/1626 345/156 |
| 2011/0193771 A1 * | 8/2011 | Chronqvist | ........... | G06F 3/0414 345/156 |
| 2011/0227822 A1 * | 9/2011 | Shai | ...................... | G06F 1/1615 345/156 |
| 2013/0197819 A1 * | 8/2013 | Vanska | ................. | H04M 19/04 702/33 |

(Continued)

*Primary Examiner* — Joe H Cheng
(74) *Attorney, Agent, or Firm* — Brinks Gilson & Lione; G. Peter Nichols

(57) ABSTRACT

An information processing method and an electronic device related to a field of communication technique are described. The method includes obtaining an operation performed by an operator on the electronic device, wherein the operation is capable of producing a force on the electronic device detecting a parameter of the operation; deforming the electronic device in response to the operation when the parameter satisfies a first condition; and generating a control instruction based on the operation when the parameter does not satisfy the first condition or satisfies a second condition, and at the same time maintaining the electronic device to be not deformed or to be deformed in a degree lower than a preset threshold. A false operation can be avoided in the process of bending the flexible screen, and accuracy of operation with respect to the flexible screen can be improved.

20 Claims, 7 Drawing Sheets

(56) References Cited

U.S. PATENT DOCUMENTS

| | | | | |
|---|---|---|---|---|
| 2014/0111549 A1* | 4/2014 | Vanska | ............... | G06F 1/1626 |
| | | | | 345/656 |
| 2014/0354791 A1* | 12/2014 | Lee | ................. | G06K 9/00228 |
| | | | | 348/77 |
| 2015/0277854 A1* | 10/2015 | Zhang | ................ | G06F 1/1652 |
| | | | | 345/156 |
| 2015/0286288 A1* | 10/2015 | Lee | .................... | G06F 3/0304 |
| | | | | 345/173 |
| 2016/0188024 A1* | 6/2016 | Xu | ...................... | G06F 3/041 |
| | | | | 345/173 |
| 2016/0231813 A1* | 8/2016 | Xu | ..................... | G06F 3/0488 |

* cited by examiner

INFORMATION PROCESSING METHOD AND ELECTRONIC DEVICE

This application claims priority to Chinese patent application No. 201510583742.6 filed on Sep. 14, 2015, the entire contents of which are incorporated herein by reference.

The present disclosure relates to a field of communication technique, in particular to an information processing method and an electronic device.

BACKGROUND

Compared with a traditional screen, a flexible screen not only has lighter weight, thinner size and lower power consumption but also has a higher endurance capability, and at the same time, the flexible screen is applied widely due to its characteristics of bendability and better flexibility.

In addition, based on the characteristic of better flexibility of the flexible screen, parameter values such as luminance, volume and vibration and so on of the electronic device can be adjusted by pressing the flexible screen in the prior art.

Inventors of the present disclosure find that the prior art has at least following technical problems: in the prior art, when a user performs bending operation on the flexible screen, several force bearing points would always act on the flexible screen simultaneously, therefore, once force bearing at a point of these force bearing points satisfies the requirement for adjusting parameter values such as luminance, volume and vibration and so on of the electronic device, the electronic device would misjudge the bending operation which should be only a bending operation as an operation of adjusting parameters such as luminance and so on. That is, in the prior art, the technical problem of false operation would occur easily in the process of bending the flexible screen.

SUMMARY

There are provided in embodiments of the present disclosure an information processing method and an electronic device, which are used to solve the technical problem that a false operation would occur easily in the process of bending the flexible screen, so that the technical effect of accuracy of operation performed on the flexible screen is ensured.

According to one aspect of the embodiments of the present disclosure, there is provided an information processing method, comprising: obtaining an operation performed by an operator on the electronic device, wherein the operation is capable of producing a force on the electronic device; detecting a parameter of the operation; deforming the electronic device in response to the operation when the parameter satisfies a first condition; and generating a control instruction based on the operation when the parameter does not satisfy the first condition or satisfies a second condition, and at the same time maintaining the electronic device to be not deformed or to be deformed in a degree lower than a preset threshold.

Optionally, said generating a control instruction based on the operation when the parameter does not satisfy the first condition or satisfies a second condition comprises: generating the control instruction based on a pressure value produced by the operation on the electronic device when the parameter does not satisfy the first condition or satisfies the second condition.

Optionally, said generating the control instruction based on a pressure value produced by the operation on the electronic device when the parameter does not satisfy the first condition or satisfies the second condition comprises: adjusting a function parameter of the electronic device based on the pressure value in response to the control instruction.

Optionally, said detecting a parameter of the operation comprises: detecting a number of current force bearing points of the electronic device based on the operation.

Optionally, said generating a control instruction based on the operation when the parameter does not satisfy the first condition or satisfies second condition comprises: determining that the parameter does not satisfy the first condition or satisfies the second condition when the number is only one; and generating the control instruction based on the operation.

Optionally, said deforming the electronic device in response to the operation when the parameter satisfies a first condition comprises: determining that the parameter satisfies the first condition when the number is at least two; and deforming the electronic device in response to the operation.

Optionally, said detecting a parameter of the operation comprises: detecting a coordinate position of a current force bearing point of the electronic device based on the operation.

Optionally, said deforming the electronic device in response to the operation when the parameter satisfies a first condition comprises: determining that the parameter satisfies the first condition when the number of the current force bearing points is at least two and the coordinate position satisfies a first preset condition; and deforming the electronic device in response to the operation.

Optionally, said detecting a parameter of the operation comprises: detecting a force bearing direction of a current force bearing point corresponding to the operation.

Optionally, said generating a control instruction based on the operation when the parameter does not satisfy the first condition or satisfies a second condition comprises: determining that the parameter does not satisfy the first condition or satisfies the second condition when the force bearing direction satisfies a second preset condition; and generating the control instruction based on the operation.

Optionally, said determining that the parameter does not satisfy the first condition or satisfies the second condition when the force bearing direction satisfies a second preset condition comprises: determining that the parameter does not satisfy the first condition or satisfies the second condition when the force bearing direction is a direction vertical to a force bearing surface of the electronic device.

Optionally, said deforming the electronic device in response to the operation when the parameter satisfies a first condition comprises: determining that the parameter satisfies the first condition when an included angle between the force bearing direction and a preset direction is greater than a preset included angle; and deforming the electronic device in response to the operation.

Optionally, said detecting a parameter of the operation comprises: detecting the force bearing direction of the current force bearing point corresponding to the operation and the coordinate position of the current force bearing point.

Optionally, said deforming the electronic device in response to the operation when the parameter satisfies a first condition comprises: determining that the parameter satisfies the first condition when the number of the current force bearing points is at least two and at least two directions of the force bearing directions are different; and deforming the electronic device in response to the operation.

Optionally, said detecting a parameter of the operation comprises: determining a value range that a borne force at the current force bearing point corresponding to the operation falls into when the operation is acted on the electronic device; and determining a duration that the borne force falls into the value range.

Optionally, said deforming the electronic device in response to the operation when the parameter satisfies a first condition comprises: determining that the parameter satisfies the first condition if the duration is greater than a first time threshold; and deforming the electronic device in response to the operation.

Optionally, said generating a control instruction based on the operation when the parameter does not satisfy the first condition or satisfies a second condition comprises: determining that the parameter does not satisfy the first condition or satisfies the second condition if the duration is smaller than a second time threshold, wherein the second time threshold is not greater than the first time threshold; and generating the control instruction based on the operation.

Optionally, said detecting a parameter of the operation comprises: detecting a value of the force acted by the operation on the electronic device.

Optionally, said deforming the electronic device in response to the operation when the parameter satisfies a first condition comprises: determining that the parameter satisfies the first condition if the value is greater than a first preset value, and deforming the electronic device in response to the operation.

Optionally, said generating a control instruction based on the operation when the parameter does not satisfy the first condition or satisfies a second condition comprises: determining that the parameter does not satisfy the first condition or satisfies the second condition if the value is greater than a second preset value and smaller than the first preset value and generating the control instruction based on the operation.

According to another aspect of the embodiments of the present disclosure, there is further provided an electronic device, comprising: a deformable display screen; a processor connected to the deformable display screen, wherein the processor is configured to: obtain an operation performed by an operator on the electronic device, wherein the operation is capable of producing a force on the electronic device; detect a parameter of the operation; control to deform the electronic device in response to the operation when the parameter satisfies a first condition; and generate a control instruction based on the operation when the parameter does not satisfy the first condition or satisfies a second condition, and at the same time maintain the electronic device to be not deformed or to be deformed in a degree lower than a preset threshold.

Optionally, the processor is configured to: generate the control instruction based on a pressure value produced by the operation on the electronic device when the parameter does not satisfy the first condition or satisfies the second condition.

Optionally, the processor is configured to: adjust a function parameter of the electronic device based on the pressure value.

Optionally, the processor is configured to: detect a number of current force bearing points of the electronic device based on the operation.

Optionally, the processor is configured to: determine that the parameter does not satisfy the first condition or satisfies the second condition when the number is only one; and generate the control instruction based on the operation.

Optionally, the processor is configured to: determine that the parameter satisfies the first condition when the number is at least two; and control to deform the electronic device in response to the operation.

Optionally, the processor is configured to: detect a coordinate position of a current force bearing point of the electronic device based on the operation.

Optionally, the processor is configured to: determine that the parameter satisfies the first condition when the number of the current force bearing points is at least two and the coordinate positions satisfy a first preset condition; and control to deform the electronic device in response to the operation.

Optionally, the processor is configured to: detect a force bearing direction of a current force bearing point corresponding to the operation.

Optionally, the processor is configured to: determine that the parameter does not satisfy the first condition or satisfies the second condition when the force bearing direction satisfies a second preset condition; and generate the control instruction based on the operation.

Optionally, the processor is configured to: determine that the parameter does not satisfy the first condition or satisfies the second condition when the force bearing direction is a direction vertical to a force bearing surface of the electronic device.

Optionally, the processor is configured to: determine that the parameter satisfies the first condition when an included angle between the force bearing direction and a preset direction is greater than a preset included angle; and control to deform the electronic device in response to the operation.

According to a third aspect of the embodiments of the present disclosure, there is provided an electronic device, comprising: a first obtaining unit configured to obtain an operation performed by an operator on the electronic device, wherein the operation is capable of producing a force on the electronic device; a first detecting unit configured to detect a parameter of the operation; a first responding unit configured to deform the electronic device in response to the operation when the parameter satisfies a first condition; and a first control unit configured to generate a control instruction based on the operation when the parameter does not satisfy the first condition or satisfies a second condition, and at the same time maintain the electronic device to be not deformed or to be deformed in a degree lower than a preset threshold.

The above one or more technical solutions in the embodiments of the present application have at least following one or more technical effects:

In the technical solution of the embodiments of the present application, an operation performed by an operator on the electronic device is obtained, wherein the operation is capable of producing a force on the electronic device, a parameter of the operation is detected, the electronic device is deformed in response to the operation when the parameter satisfies a first condition, and the electronic device generates a control instruction based on the operation when the parameter does not satisfy the first condition or satisfies the second condition, and at the same time, the electronic device is maintained to be not deformed or to be deformed in a degree lower than a preset threshold. That is, when an operation is performed on a deformable electronic device, by judging the condition satisfied currently by the parameter corresponding to the operation, when the parameter satisfies the first condition, the electronic device is deformed; when the parameter does not satisfy the first condition or satisfies the second condition, the electronic device generates a control instruction based on the operation, so that the operation produces different action effects for the electronic device. Therefore, false operation caused in the process of bending the flexible screen is avoided effectively while the technical effect of accuracy of the operation performed on the flexible screen is raised.

BRIEF DESCRIPTION OF THE DRAWINGS

In order to describe technical solutions in the embodiments of the present disclosure or in the prior art more clearly, accompanying figures needed to be used in the description of the embodiments will be introduced simply. Obviously, figures in the following description are just some embodiments of the present disclosure.

DETAILED DESCRIPTION

Figure 1:
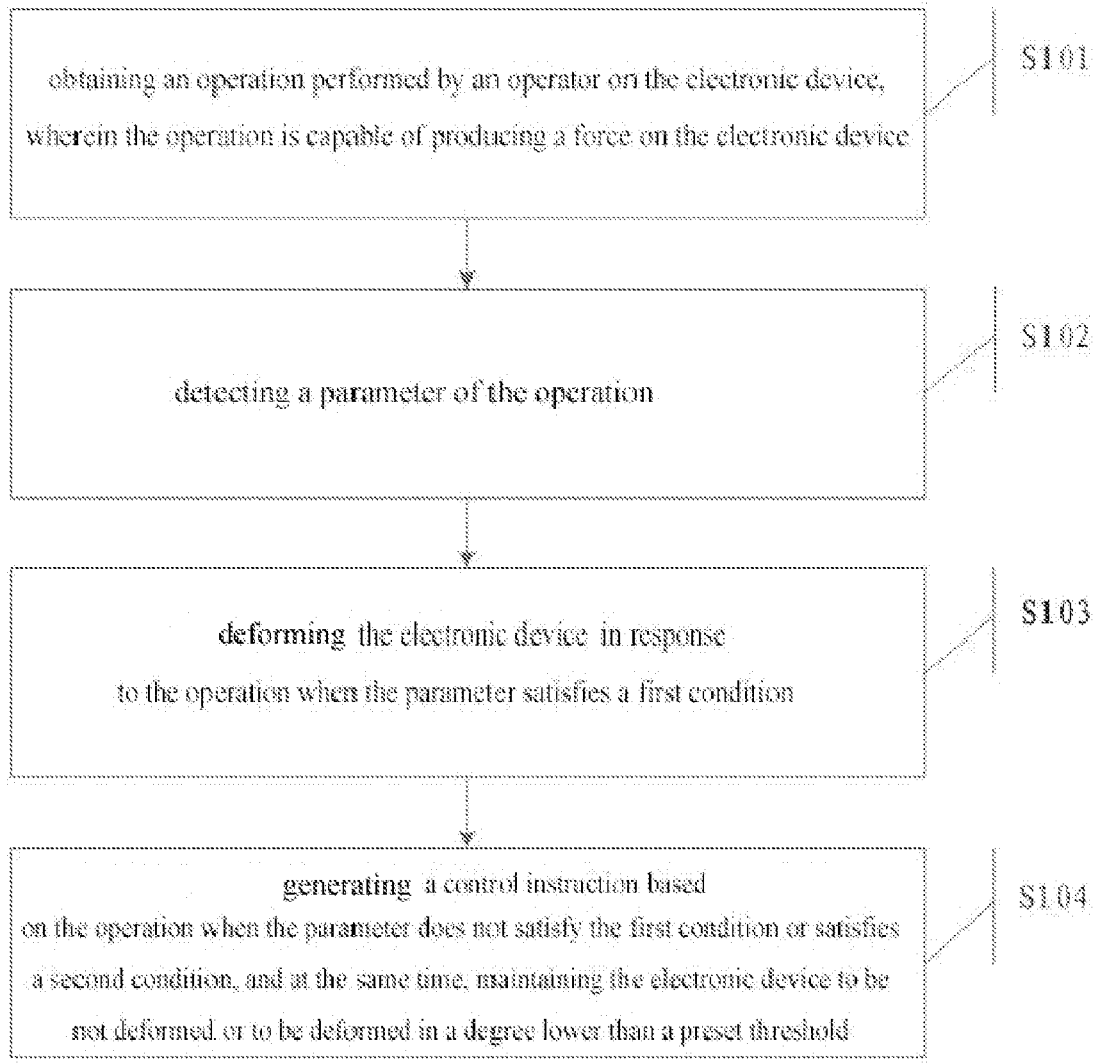
FIG. 1 is a flowchart of an information processing method provided in a first embodiment of the present disclosure.

Embodiments of the present disclosure provide an information processing method and an electronic device, which are used to solve the technical problem that a false operation would occur easily in the process of bending the flexible screen, so that the technical effect of accuracy of operation performed on the flexible screen is ensured.

In order to solve the above technical problem, technical solutions in the embodiments of the present application have following general approaches:

An information processing method is applied to a deformable electronic device, comprising: obtaining an operation performed by an operator on the electronic device, wherein the operation is capable of producing a force on the electronic device; detecting a parameter of the operation; deforming the electronic device in response to the operation when the parameter satisfies a first condition; and generating a control instruction based on the operation when the parameter does not satisfy the first condition or satisfies the second condition, and at the same time, maintaining the electronic device to be not deformed or to be deformed in a degree lower than a preset threshold.

In the technical solution of the embodiments of the present application, an operation performed by an operator on the electronic device is obtained, wherein the operation is capable of producing a force on the electronic device, a parameter of the operation is detected, the electronic device is deformed in response to the operation when the parameter satisfies a first condition, and the electronic device generates a control instruction based on the operation when the parameter does not satisfy the first condition or satisfies the second condition, and at the same time, the electronic device is maintained to be not deformed or to be deformed in a degree lower than a preset threshold. That is, when an operation is performed on a deformable electronic device, by judging the condition satisfied currently by the parameter corresponding to the operation, when the parameter satisfies the first condition, the electronic device is deformed; when the parameter does not satisfy the first condition or satisfies the second condition, the electronic device generates a control instruction based on the operation, so that the operation produces different action effects for the electronic device. Therefore, false operation caused in the process of bending the flexible screen is avoided effectively while accuracy of the operation performed on the flexible screen is raised.

In order to understand the technical solutions better, the technical solutions of the present disclosure will be described in detail by combining with the accompanying figures and specific embodiments. It should be understood that embodiments of the present disclosure and specific features in the embodiments are detailed description of the technical solutions of the present disclosure, instead of limitation to the technical solution of the present disclosure. Embodiments of the present disclosure and technical features in the embodiments can be combined with each other in the case of causing no conflicts.

In the embodiments of the present disclosure, in particular, the electronic device may be a desktop computer having a flexible screen, or may be a notebook computer, or may be a smart phone, or may be a tablet computer and so on. Examples are not given one by one herein.

First Embodiment

With reference to FIG. 1, there is provided in an embodiment of the present disclosure an information processing method, comprising: S101: obtaining an operation performed by an operator on the electronic device, wherein the operation is capable of producing a force on the electronic device; S102: detecting a parameter of the operation; S103: deforming the electronic device in response to the operation when the parameter satisfies a first condition; and S104: generating a control instruction based on the operation when the parameter does not satisfy the first condition or satisfies a second condition, and at the same time, maintaining the electronic device to be not deformed or to be deformed in a degree lower than a preset threshold.

In the embodiment of the present disclosure, specific implementation processes of steps S101 to S104 are as follows.

The specific implementation process of the technical solutions in the embodiment of the present disclosure is described by taking the electronic device being a deformable smart phone as an example. First, an operation performed by an operator on the electronic device is obtained, wherein the operation is capable of producing a force on the electronic device; herein, the operator can be fingers of a user, or can be a touch pen and so on. Examples are not given one by one herein. Then, information of parameter such as a number of force bearing points, coordinate positions of force bearing points and force bearing directions of force bearing points and so on is detected and obtained based on the operation. Then, a condition satisfied by the detected and obtained parameter is determined. When the parameter satisfies different conditions, operations performed on the electronic device are also different. In particular, when the parameter satisfies the first condition, the electronic device is deformed in response to the operation; when the parameter does not satisfy the first condition or satisfies the second condition, the electronic device generates the control instruction based on the operation, and at the same time, the electronic device is maintained to be not deformed or to be deformed in a degree lower than the preset threshold. That is, based on the operation, the electronic device would be deformed or generate other control instructions to control the electronic device. In addition, in the specific implementation process of the embodiment of the present disclosure, a sequence of performing step S103 or step S104 by the electronic device can be in particular synchronous, or can be that parameter judging of step S103 is performed first, and then parameter judging of step S104 is performed, or can be that parameter judging of step S104 is performed first, and then parameter judging of step S103 is performed. Of course, the specific sequence for parameter judging performed by the electronic device can be set according to the requirement for those skilled in the art. No further description is given herein. FIG. 1 is one of method flowcharts, and is in particular a method flowchart of first performing parameter judging of step S103 and then performing parameter judging of step S104.

In the embodiment of the present disclosure, step S104 of generating a control instruction based on the operation when the parameter does not satisfy the first condition or satisfies a second condition is in particular as follows: generating the control instruction based on a pressure value produced by the operation on the electronic device when the parameter does not satisfy the first condition or satisfies the second condition.

In the specific implementation process, a pressure sensor being capable of detecting that the operator is acted on the flexible screen of the electronic device is disposed in the electronic device. Of course, for those skilled in the art, a function module being capable of detecting the pressure value can be designed. Examples are not given one by one herein. For a specific example, when the operation is in particular a pressing operation performed on the flexible screen of the electronic device, and the parameter does not satisfy the first condition or satisfies the second condition, a control instruction is generated based on a pressure value corresponding to the pressing operation performed on the electronic device. Functions parameters of the electronic device are adjusted based on the pressure value in response to the control instruction. For example, corresponding parameters in the electronic device are adjusted with respect to a specific correspondence relationship between the pressure value and function parameters in the electronic device such as volume, luminance and contrast ratio and so on. For example, when the pressure value corresponding to the operation is in particular a pressure value parameter used to adjust the volume of the electronic device, the volume of the electronic device is adjusted to a volume corresponding to the specific pressure value currently corresponding to the operation.

In the embodiment of the present application, conditions satisfied by the parameters can be judged based on different parameters. In particular, there could have six implementations, but being not only limited to following six implementations.

First Implementation

The first implementation is in particular as follows: judging conditions satisfied by the parameters based on a number of current force bearing points of the electronic device. In particular, in the first implementation, step S102 of detecting a parameter of the operation is in particular as follows: detecting the number of the current force bearing points of the electronic device based on the operation.

Figure 2:
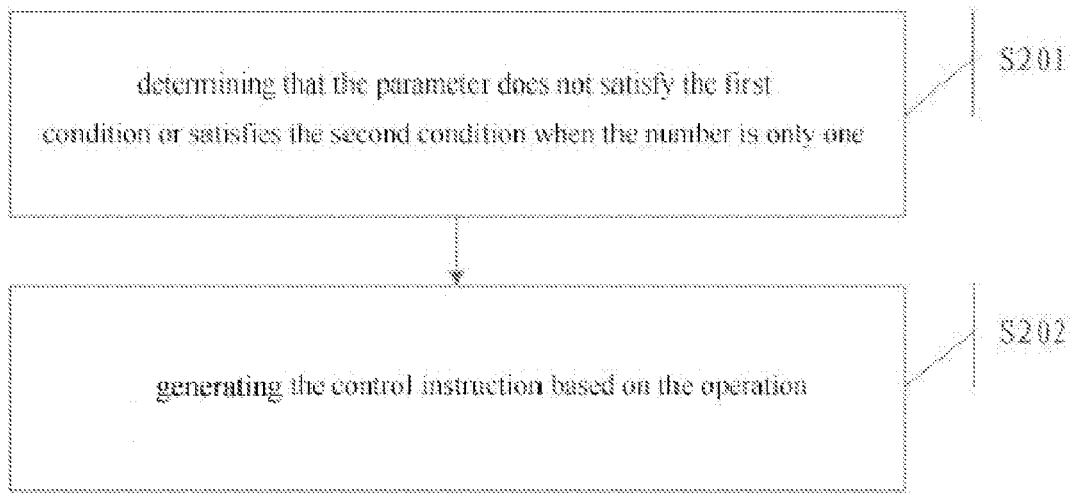
FIG. 2 is a method flowchart of a first implementation of step S104 of the information processing method provided in the first embodiment of the present disclosure.

At this time, with reference to FIG. 2, step S104 of generating a control instruction based on the operation when the parameter does not satisfy the first condition or satisfies a second condition in particular comprises: S201: determining that the parameter does not satisfy the first condition or satisfies the second condition when the number is only one; S202: generating the control instruction based on the operation.

In the specific implementation process, specific implementation processes of steps S201 to S202 are as follows.

When it is detected that the number of the force bearing points currently borne by the electronic device is only one, the operation does not belong to a bending operation performed on the electronic device, that is, it is determined that the parameter does not satisfy the first condition or satisfies the second condition. At this time, the electronic device generates, based on the operation, the control instruction used to adjust function parameters of the electronic device such as volume, contrast ratio and so on or used to control the electronic device to be in other states.

Figure 3:
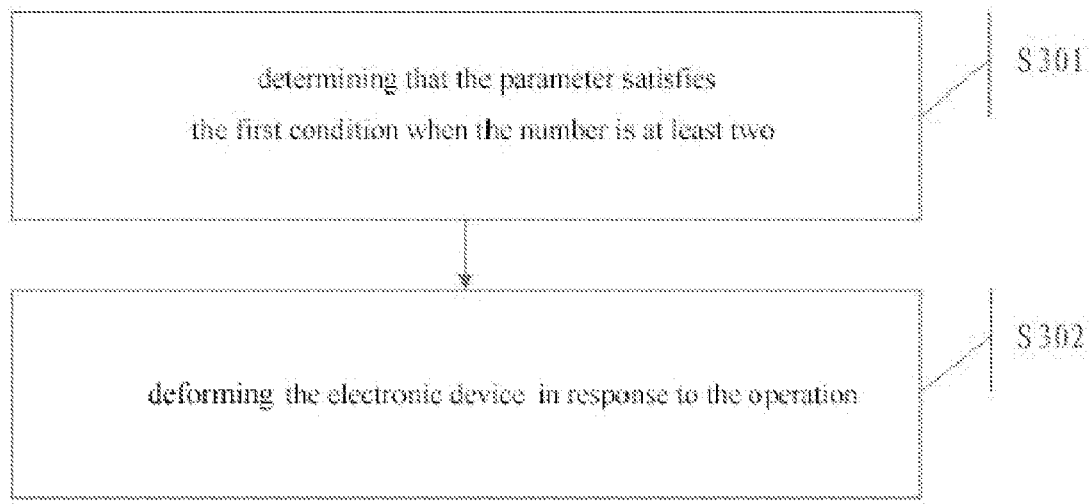
FIG. 3 is a method flowchart of a first implementation of step S103 of the information processing method provided in the first embodiment of the present disclosure.

In a first implementation, with reference to FIG. 3, step S103 of deforming the electronic device in response to the operation when the parameter satisfies the first condition in particular comprises: S301: determining that the parameter satisfies the first condition when the number is at least two; S302: deforming the electronic device in response to the operation.

In the specific implementation, the specific implementation processes of steps S301 to S302 are as follows.

When it is detected that the number of the force bearing points borne currently by the electronic device is multiple, it is indicated that the parameter satisfies the first condition, and the flexible screen of the electronic device would be deformed in response to the operation. In the specific implementation process, the bending operation being capable of making the flexible screen of the electronic device be deformed would always produce a plurality of force bearing points on the electronic device. Therefore, in the embodiment of the present application, the condition satisfied by the parameter can be judged based on the number of force bearing points produced by the operation currently performed on the electronic device. In addition, in order to ensure judging the number of force bearing points correctly and further ensure the accuracy of the judging result, force bearing points within a specific coordinate range can be set as one force bearing point, or force bearing points within specific force bearing value range can be set as one force bearing point, or it can be judged comprehensively by combining with time length of endurance. Examples are not given one by one herein.

Second Implementation

The second implementation is in particular as follows: judging the condition satisfied by the parameter based on the coordinate position of the current force bearing point of the electronic device. In particular, in the second implementation, step S102 of detecting a parameter of the operation is in particular as follows: detecting the coordinate position of the current force bearing point of the electronic device based on the operation.

Figure 4:
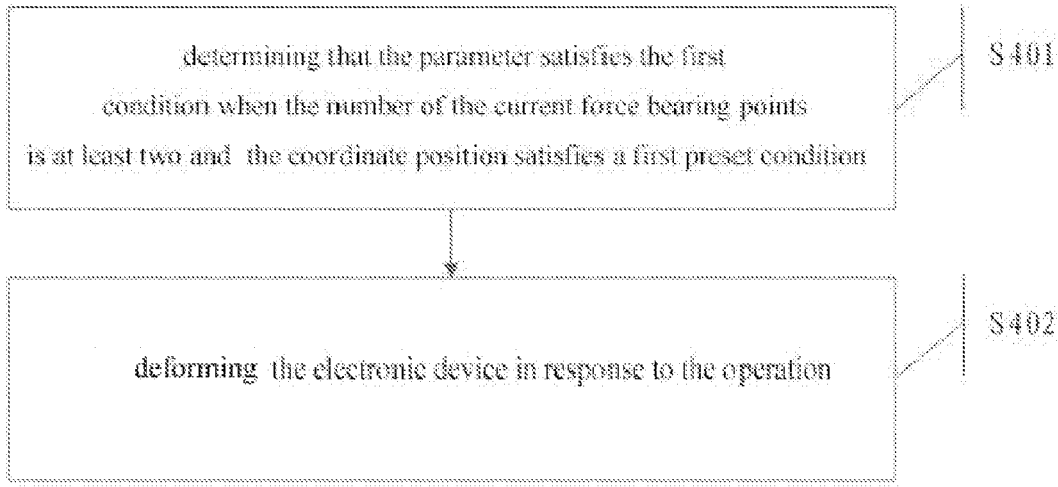
FIG. 4 is a method flowchart of a second implementation of step S103 of the information processing method provided in the first embodiment of the present disclosure.

In the second implementation, with reference to FIG. 4, step S103 of deforming the electronic device in response to the operation when the parameter satisfies the first condition in particular comprises: S401: determining that the parameter satisfies the first condition when the number of the current force bearing points is at least two and the coordinate position satisfies a first preset condition; S402: deforming the electronic device in response to the operation.

In the specific implementation process, the specific implementation processes of steps S401 to S402 are as follows.

When the number of force bearing points acted by the operation on the electronic device is at least two, and when the coordinate position of each force bearing point satisfies the first preset condition, it is determined that the parameter satisfies the first condition. By taking a specific example for instance, a coordinate position at a force bearing point A is (1, 1), a coordinate position at a force bearing point B is (2, 2), a coordinate position of a force bearing point C is (3, 3), and a coordinate position at a force bearing point D is (4, 4), after these bearing points are analyzed and processed by the processor in the electronic device, it can be known that the force bearing points A, B, and C are located on a same straight line, which indicates that the parameter corresponding to the operation currently acted on the electronic device satisfies the first preset condition, that is, the operation is corresponding to the bending operation performed on the electronic device, and the electronic device would be deformed in response to the operation under the effect of the bending operation. For another example, a coordinate position at a force bearing point A is (1, 1), a coordinate position at a force bearing point E is (2, 4), and a coordinate position at a force bearing point F is (3, 9). After these bearing points are analyzed and processed by the processor, it can be known that the force bearing points A, E, F are located on a same parabola, which indicates that the parameter corresponding to the operation currently acted on the electronic device satisfies the first preset condition, that is, the operation is corresponding to the bending operation performed on the electronic device, and the electronic device would be deformed in response to the operation under the effect of the bending operation. In the specific implementation process, when there are a plurality of force bearing points acting on the electronic device, those skilled in the art can set a plurality of factors to set the first preset condition simultaneously depending on a specific situation. No further description is given one by one herein.

Third Implementation

The third implementation is in particular as follows: judging the condition satisfied by the parameter based on the force bearing direction of the current force bearing point corresponding to the operation. In particular, in the third implementation, step S102 of detecting a parameter of the operation is in particular as follows: detecting the force bearing direction of the current force bearing point corresponding to the operation.

Figure 5:
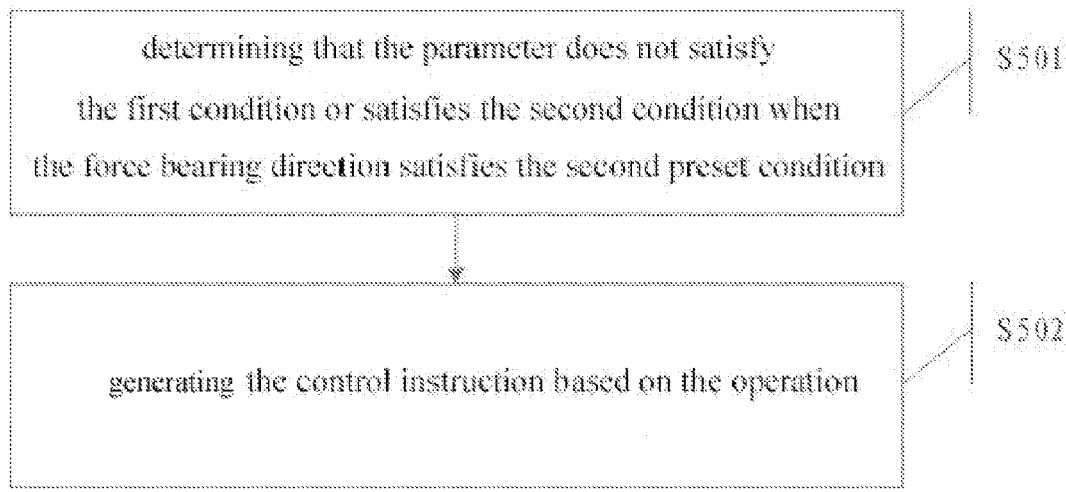
FIG. 5 is a method flowchart of a third implementation of step S104 of the information processing method provided in the first embodiment of the present disclosure.

In the third implementation, with reference to FIG. 5, step S104 of generating the control instruction based on the operation when the parameter does not satisfy the first condition or satisfies the second condition in particular comprises: S501: determining that the parameter does not satisfy the first condition or satisfies the second condition when the force bearing direction satisfies the second preset condition; S502: generating the control instruction based on the operation.

In the specific implementation process, the specific implementation processes of steps S501 to S502 are as follows.

When the force bearing direction of the current force bearing point where the operation is acted on the electronic device satisfies the second preset condition, it is determined that the parameter does not satisfy the first condition or satisfies the second condition, and at this time, the electronic device generates the control instruction based on the operation. In particular, step S501 of determining that the parameter does not satisfy the first condition or satisfies the second condition when the force bearing direction satisfies the second preset condition is in particular as follows: determining that the parameter does not satisfy the first condition or satisfies the second condition when the force bearing direction is in particular a direction vertical to the force bearing surface of the electronic device. When it is detected that the force bearing direction corresponding to the force bearing point acting on the display screen of the electronic device is vertical to the display screen of the electronic device, it is indicated that the parameter does not satisfy the first condition or satisfies the second condition.

Figure 6:
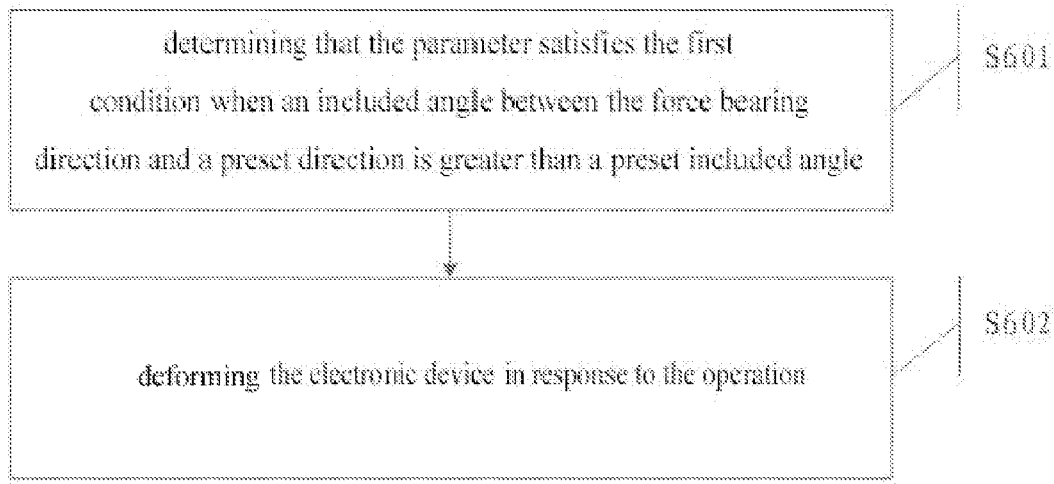
FIG. 6 is a method flowchart of a third implementation of step S103 of the information processing method provided in the first embodiment of the present disclosure.

In the third implementation, with reference to FIG. 6, step S103 of the electronic device deforming in response to the operation when the parameter satisfies the first condition in particular comprises: S601: determining that the parameter satisfies the first condition when an included angle between the force bearing direction and a preset direction is greater than a preset included angle; S602: deforming the electronic device in response to the operation.

In the specific implementation, the specific implementation processes of steps S601 to S602 is as follows.

When it is detected that an included angle between the force bearing direction of the force bearing point where the operation is acted on the electronic device and a preset direction is greater than a preset included angle, it is determined that the parameter satisfies the first condition, which indicates that the operation can be a bending operation. At this time, the electronic device would be deformed in response to the operation. By taking a specific example for instance, in the case that the electronic device does not bear any force, a surface where the display screen of the electronic device is located is a plane. When the operation is acted on the display screen of the electronic device, the direction vertical to the plane where the display screen of the electronic device is located is set as the preset direction, and the preset included angle is set as 5°. When it is detected that an included angle between the force bearing direction and the direction vertical to the plane where the display screen of the electronic device is located is greater than a preset included angle, it is determined that the parameter satisfies the first condition, which indicates that the operation is a bending operation performed on the electronic device. At this time, the electronic device would be deformed in response to the operation.

Fourth Implementation

The fourth implementation is in particular as follows: judging the condition satisfied by the parameter based on the force bearing direction of the current force bearing point corresponding to the operation and the coordinate position of the current force bearing point. In particular, in the fourth implementation, step S102 of detecting a parameter of the operation is in particular as follows: detecting the force bearing direction of the current force bearing point corresponding to the operation.

Figure 7:
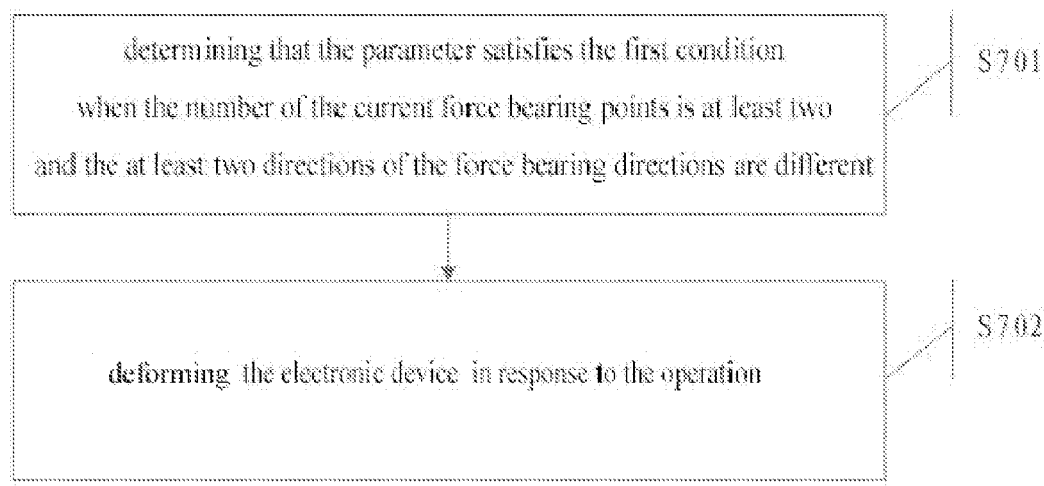
FIG. 7 is a method flowchart of a fourth implementation of step S103 of the information processing method provided in the first embodiment of the present disclosure.

In the fourth implementation, with reference to FIG. 7, step S103 of deforming the electronic device in response to the operation when the parameter satisfies the first condition in particular comprises: S701: determining that the parameter satisfies the first condition when the number of the current force bearing points is at least two and the at least two directions of the force bearing directions are different; S702: deforming the electronic device in response to the operation.

In the specific implementation, the specific implementation processes of steps S701 to S702 are as follows.

When it is detected that the number of the current force bearing points is at least two and at least two directions of the force bearing directions are different, it is indicated that the parameter satisfies the first condition, for example, the operation is a bending operation, and the electronic device is deformed under the action of the operation. In the embodiment of the present application, when there are a plurality of force bearing points, the condition satisfied by the parameter is judged by adopting a variety of judging factors, so that the accuracy of the judging result of the parameters can be ensured. In addition, in the embodiment of the present application, when there are a plurality of force bearing points and the directions of the respective force bearing points are the same with each other, it is indicated that the parameter does not satisfy the first condition or satisfies the second condition, the electronic device generates the control instruction based on the operation.

Fifth Implementation

Figure 8:
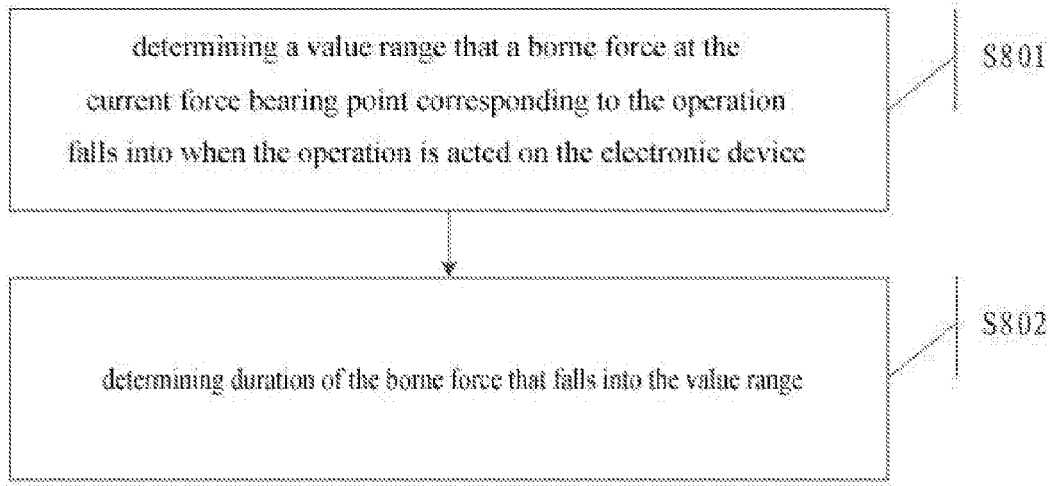
FIG. 8 is a method flowchart of a fifth implementation of step S102 of the information processing method provided in the first embodiment of the present disclosure.

The fifth implementation is in particular as follows: judging the condition satisfied by the parameter based on the action duration that the operation is acted on the electronic device. In particular, in the fifth implementation, with reference to FIG. 8, step S102 of detecting a parameter of the operation in particular comprises: S801: determining a value range that a borne force at the current force bearing point corresponding to the operation falls into when the operation is acted on the electronic device; and S802: determining duration of the borne force that falls into the value range.

In the specific implementation, the specific implementation processes of steps S801 to S802 are as follows.

First, a value range of the borne force at the current force bearing point corresponding to the operation is determined when the operation is acted on the electronic device; then, duration that the borne force falls into the value range is determined. For a specific example, when the force borne by the electronic device is pressure, a pressure value range of pressure currently borne by the electronic device is obtained through a pressure sensor inside the electronic device. Since in the process of the operation being acted on the electronic device, the electronic device would bear force continuously, in order to determine the duration of the borne force at the current force bearing point, it is required to firstly determine a force bearing point located at a specific coordinate position, then determine a pressure value detected at the coordinate position, and further determine the pressure range that the pressure value falls into, and then determine the duration of the currently borne force that falls into the pressure value range. For example, pressure values detected at the coordinate position (1, 1) are 1.12N, 1.15N, 1.13N, which belong to a pressure range of [1.1N, 1.2N], and then it can be determined that the duration for maintaining within the pressure range is 1.5 s.

Figure 9:
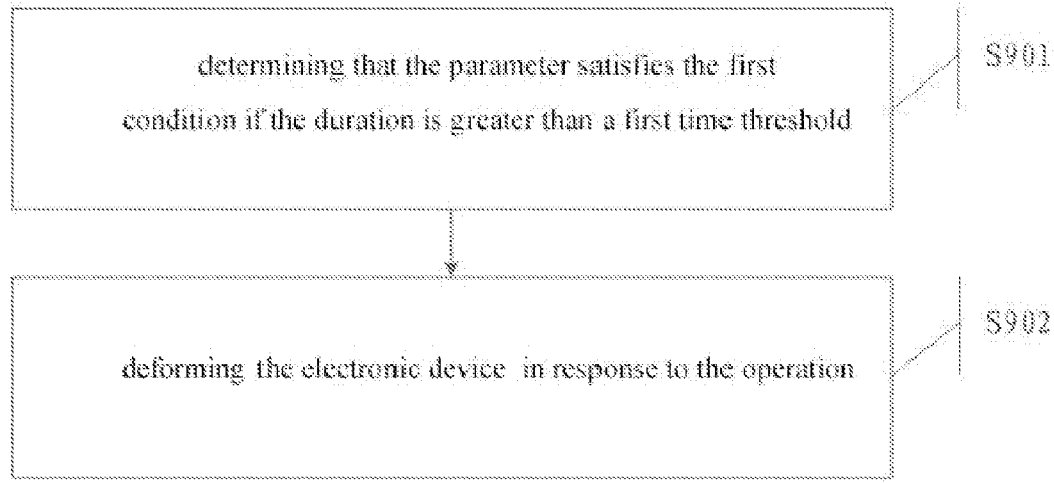
FIG. 9 is a method flowchart of a fifth implementation of step S103 of the information processing method provided in the first embodiment of the present disclosure.

In the fifth implementation, with reference to FIG. 9, step S103 of deforming the electronic device in response to the operation when the parameter satisfies the first condition in particular comprises: S901: determining that the parameter satisfies the first condition if the duration is greater than a first time threshold; and S902: deforming the electronic device in response to the operation.

In the specific implementation, the specific implementation processes of steps S901 to S902 are as follows.

Firstly, it is determined that the parameter satisfies the first condition if the duration is greater than a first time threshold; then, the electronic device is deformed in response to the operation. The duration of the borne force falling into the pressure range value as mentioned above is still used in the following explanations and descriptions. If the first time threshold is 1 s, it is indicated that the duration 1.5 s of the borne force falling into the pressure range [1.1N. 1.2N] is greater than the first time threshold, which indicates that the parameter satisfies the first condition. At this time, the electronic device is deformed in response to the operation.

Figure 10:
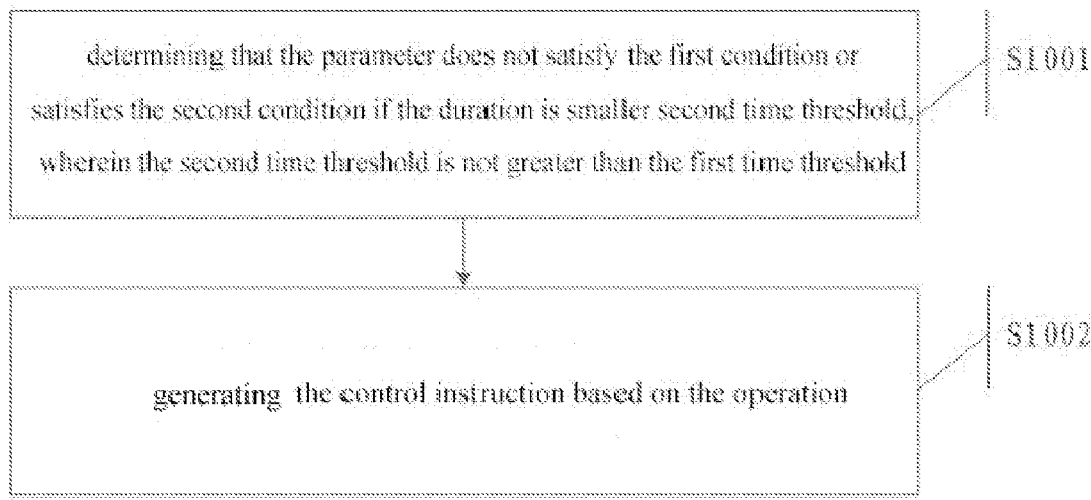
FIG. 10 is a method flowchart of a fifth implementation of S104 of the information processing method provided in the first embodiment of the present disclosure.

In the fifth implementation, with reference to FIG. 10, step S104 of generating the control instruction based on the operation when the parameter does not satisfy the first condition or satisfies the second condition in particular comprises: S1001: determining that the parameter does not satisfy the first condition or satisfies the second condition if the duration is smaller than a second time threshold, wherein the second time threshold is not greater than the first time threshold; and S1002: generating the control instruction based on the operation.

In the specific implementation, the specific implementation processes of steps S1001 to S1002 are as follows.

First, it is determined that the parameter does not satisfy the first condition or satisfies the second condition if the duration is smaller than the second time threshold, wherein the second time threshold is not greater than the first time threshold; then, the electronic device generates the control instruction based on the operation. The duration of the borne force falling into the pressure range value as mentioned above is still used in the following explanations and descriptions. If the second time threshold is 2 s, it is indicated that the duration 1.5 s for the borne force falling into the pressure range [1.1N. 1.2N] is smaller than the second time threshold, which indicates that the parameter does not satisfy the first condition or satisfies the second condition. At this time, the electronic device generates the control instruction based on the operation.

Sixth Implementation

The sixth implementation is in particular as follows: judging the condition satisfied by the parameter based on a specific value of a force acted by the operation on the electronic device. In particular, in the sixth implementation, step S102 of detecting a parameter of the operation is in particular as follows: detecting a value of a force acted by the operation on the electronic device.

In the sixth implementation, step S103 of deforming the electronic device in response to the operation when the parameter satisfies the first condition is in particular as follows: determining that the parameter satisfies the first condition and deforming the electronic device in response to the operation if the value is greater than a first preset value.

Step S104 of generating the control instruction based on the operation when the parameter does not satisfy the first condition or satisfies the second condition is in particular as follows: determining that the parameter does not satisfy the first condition or satisfies the second condition, and generating the control instruction based on the operation if the value is greater than a second preset value and smaller than the first preset value.

In the embodiment of the present application, for example, if a force acting on the electronic device is 2.23N, and the first preset value is 1.51N, then it is indicated that the value corresponding to the force acting on the electronic device is greater than the first preset value. At this time, the parameter satisfies the first condition, and the electronic device would be deformed in response to the operation. For another example, if the second preset value is 1.35N, then if it is indicated that the value corresponding to the force acting on the electronic device is greater than the second preset value and smaller than the first preset value, which indicates that the parameter does not satisfy the first condition or satisfies the second condition, and the electronic device generates the control instruction based on the operation. Of course, the specific values involving in the above examples are just to describe the technical solutions in the embodiments of the present disclosure clear, but it does not mean that they are limitations to the technical solutions of the present disclosure. Of course, those skilled in the art can make a corresponding combination of the above six implementations according to the requirement. For example, in order to determine the number of the force bearing points accurately, the specific condition satisfied by the parameter is judged together with the duration comprehensively. In addition, other implementations can also be designed according to the actual requirement of the user. No further description is given one by one herein.

Second Embodiment

Figure 11:
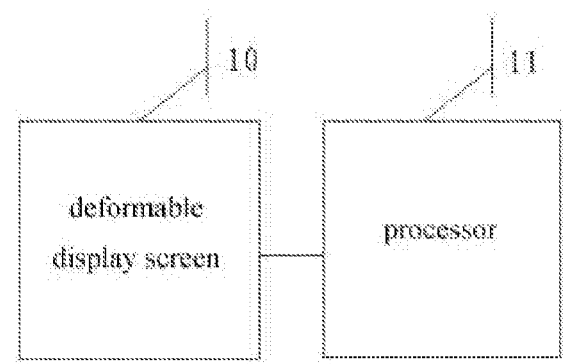
FIG. 11 is a block diagram of a configuration of an electronic device provided in a second embodiment of the present disclosure.

With reference to FIG. 11, based on the same inventive concept as the first embodiment, the second embodiment of the present disclosure provides an electronic device, comprising: a deformable display screen 10 and a processor 11 connected to the deformable display screen 10.

The processor 11 is in particular configured to: obtain an operation performed by an operator on the electronic device, wherein the operation is capable of producing a force on the electronic device; detect a parameter of the operation; control to deform the electronic device in response to the operation when the parameter satisfies a first condition; and generate a control instruction based on the operation when the parameter does not satisfy the first condition or satisfies a second condition, and at the same time maintain the electronic device to be not deformed or to be deformed in a degree lower than a preset threshold.

In the embodiment of the present disclosure, the processor 11 is in particular configured to: generate the control instruction based on a pressure value produced by the operation on the electronic device when the parameter does not satisfy the first condition or satisfies the second condition.

In the embodiment of the present disclosure, the processor 11 is in particular configured to: adjust a function parameter of the electronic device based on the pressure value.

In the embodiment of the present disclosure, the processor 11 is in particular configured to: detect a number of current force bearing points of the electronic device based on the operation.

In the embodiment of the present disclosure, the processor 11 is in particular configured to: determine that the parameter does not satisfy the first condition or satisfies the second condition when the number is only one; and generate the control instruction based on the operation.

In the embodiment of the present disclosure, the processor 11 is in particular configured to: determine that the parameter satisfies the first condition when the number is at least two; and control to deform the electronic device in response to the operation.

In the embodiment of the present disclosure, the processor 11 is in particular configured to: detect a coordinate position of a current force bearing point of the electronic device based on the operation.

In the embodiment of the present disclosure, the processor 11 is in particular configured to: determine that the parameter satisfies the first condition when the number of the current force bearing points is at least two and the coordinate position satisfies the first preset condition; and control to deform the electronic device in response to the operation.

In the embodiment of the present disclosure, the processor 11 is in particular configured to: detect a force bearing direction of the current force bearing point corresponding to the operation.

In the embodiment of the present disclosure, the processor 11 is in particular configured to: determine that the parameter does not satisfy the first condition or satisfies the second condition when the force bearing direction satisfies a second preset condition; and generate the control instruction based on the operation.

In the embodiment of the present disclosure, the processor 11 is in particular configured to: determine that the parameter does not satisfy the first condition or satisfies the second condition when the force bearing direction is in particular a direction vertical to a force bearing surface of the electronic device.

In the embodiment of the present disclosure, the processor 11 is in particular configured to: determine that the parameter satisfies the first condition when an included angle between the force bearing direction and a preset direction is greater than a preset included angle; and control to deform the electronic device in response to the operation.

Third Embodiment

Figure 12:
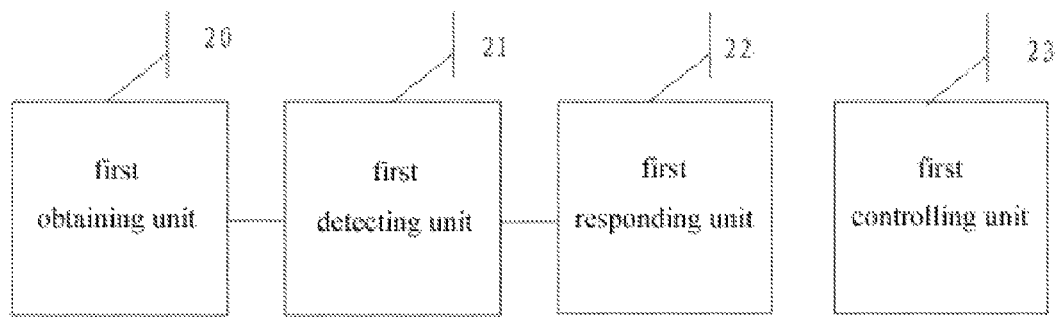
FIG. 12 is a block diagram of a configuration of an electronic device provided in a third embodiment of the present disclosure.

With reference to FIG. 12, based on the same inventive concept as the first embodiment of the present application, the third embodiment of the present disclosure provides an electronic device, comprising: a first obtaining unit 20 configured to obtain an operation performed by an operator on the electronic device, wherein the operation is capable of producing a force on the electronic device; a first detecting unit 21 configured to detect a parameter of the operation; a first responding unit 22 configured to deform the electronic device in response to the operation when the parameter satisfies a first condition; and a first control unit 23 configured to generate a control instruction based on the operation when the parameter does not satisfy the first condition or satisfies a second condition, and at the same time, maintain the electronic device to be not deformed or to be deformed in a degree lower than a preset threshold.

In the embodiment of the present application, the first control unit 23 is in particular a pressure control unit, wherein the pressure control unit is in particular configured to generate the control instruction based on a pressure value produced by the operation on the electronic device when the parameter does not satisfy the first condition or satisfies the second condition.

In the embodiment of the present application, the first control unit 23 in particular comprises: a first adjusting unit configured to adjust a function parameter of the electronic device based on the pressure value in response to the control instruction.

In the embodiment of the present disclosure, the first detecting unit 21 is in particular a force bearing point number detecting unit configured to detect a number of current force bearing points of the electronic device.

In the embodiment of the present disclosure, the first control unit 23 in particular comprises: a first determining module configured to determine that the parameter does not satisfy the first condition or satisfies the second condition when the number is only one; and a first control module configured to generate the control instruction based on the operation.

In the embodiment of the present disclosure, the first responding unit 22 in particular comprises: a second determining module configured to determine that the parameter satisfies the first condition when the number is at least two; and a first responding module configured to deform the electronic device in response to the operation.

In the embodiment of the present disclosure, the first detecting unit 21 is in particular a coordinate position detecting unit configured to detect a coordinate position of a current force bearing point of the electronic device based on the operation.

In the embodiment of the present disclosure, the first responding unit 22 in particular comprises: a third determining module configured to determine that the parameter satisfies the first condition when the number of the current force bearing points is at least two and the coordinate position satisfies the first preset condition; and a second responding module configured to deform the electronic device in response to the operation.

In the embodiment of the present disclosure, the first detecting unit 21 is in particular as follows: a force bearing detecting unit configured to detect a force bearing direction of the current force bearing point corresponding to the operation.

In the embodiment of the present disclosure, the first control unit 23 in particular comprises: a fourth determining module configured to determine that the parameter does not satisfy the first condition or satisfies the second condition when the force bearing direction satisfies the second preset condition; and a second control module configured to generate the control instruction based on the operation.

In the embodiment of the present disclosure, the fourth determining module is in particular a vertical direction determining module configured to determine that the parameter does not satisfy the first condition or satisfies the second condition when the force bearing direction is in particular a direction vertical to a force bearing surface of the electronic device.

In the embodiment of the present disclosure, the first responding unit 22 in particular comprises: a fifth determining module configured to determine that the parameter satisfies the first condition when an included angle between the force bearing direction and a preset direction is greater than a preset included angle; and a third responding module configured to deform the electronic device in response to the operation.

In the embodiment of the present disclosure, the first detecting unit 21 is in particular a force bearing direction and coordinate position detecting unit configured to detect a force bearing direction of the current force bearing point corresponding to the operation and a coordinate position of the current force bearing point corresponding to the operation.

In the embodiment of the present disclosure, the first responding unit 22 in particular comprises: a sixth determining module configured to determine that the parameter satisfies the first condition if the number of the current force bearing points is at least two and at least two directions of the force bearing directions are different; and a fourth responding module configured to deform the electronic device in response to the operation.

In the embodiment of the present disclosure, the first detecting unit 21 in particular comprises: a seventh determining module configured to determine a value range that a borne force at the current force bearing point corresponding to the operation falls into when the operation is acted on the electronic device; and an eight determining module configured to determine duration that the borne force falls into the value range.

In the embodiment of the present disclosure, the first responding unit 22 in particular comprises: a ninth determining module configured to determine that the parameter satisfies the first condition if the duration is greater than the first time threshold; and a fifth responding module configured to deform the electronic device in response to the operation.

In the embodiment of the present disclosure, the first control unit 23 in particular comprises: a tenth determining module configured to determine that the parameter does not satisfy the first condition or satisfies the second condition if the duration is smaller than a second time threshold, wherein the second time threshold is not greater than the first time threshold; and a third control module configured to generate the control instruction based on the operation.

In the embodiment of the present disclosure, the first detecting unit 21 is in particular a force value detecting unit configured to detect a value of the force acted by the operation on the electronic device.

In the embodiment of the present disclosure, the first control unit 23 in particular determines that the parameter satisfies the first condition and deforms the electronic device in response to the operation if the value is greater than the first preset value.

In the embodiment of the present disclosure, the first control unit 23 is in particular an instruction control unit configured to, if the value is greater than the second preset value and smaller than the first preset value, determine that the parameter does not satisfy the first condition or satisfies the second condition, and generate the control instruction based on the operation.

The above one or more technical solutions in the embodiments of the present application have at least following one or more technical effects.

In the technical solution of the embodiments of the present application, an operation performed by an operator on the electronic device is obtained, wherein the operation is capable of producing a force on the electronic device, a parameter of the operation is detected, the electronic device is deformed in response to the operation when the parameter satisfies a first condition, and the electronic device generates a control instruction based on the operation when the parameter does not satisfy the first condition or satisfies the second condition, and at the same time, the electronic device is maintained to be not deformed or to be deformed in a degree lower than a preset threshold. That is, when an operation is performed on a deformable electronic device, the condition satisfied currently by the parameter corresponding to the operation is judged, when the parameter satisfies the first condition, the electronic device is deformed; when the parameter does not satisfy the first condition or satisfies the second condition, the electronic device generates a control instruction based on the operation, so that the operation produces different action effects for the electronic device. Therefore, false operation caused in the process of bending the flexible screen is avoided effectively while the accuracy of the operation performed on the flexible screen is raised.

In the technical solution of the embodiment of the present disclosure, when the parameter does not satisfy the first condition or satisfies the second condition, generating the control instruction based on the operation is in particular as follows: producing the pressure value on the electronic device based on the operation, so as to adjust the function parameter based on the pressure value, so that the technical effect of quickly adjusting the function parameter in the electronic device is achieved.

In the technical solution of the embodiment of the present disclosure, measures of detecting the number of the current force bearing points of the electronic device, the coordinate position of the current force bearing points, the force bearing direction of the current force bearing point, and the duration of the value range that the current force bearing points fall into and so on can be adopted to judge the condition satisfied by the parameter according to the requirement, so that the technical effect of accuracy of the judging result is ensured.

Those skilled in the art shall understand that the embodiments of the present disclosure can be provided as a method, a system or a computer program product. Therefore, the present disclosure can adopt forms of a full hardware embodiment, a full software embodiment, or an embodiment of combining software and hardware. Furthermore, the present disclosure can adopt a form of a computer program product implemented on one or more computer-available storage media (including but not limited to magnetic disc memory, CD-ROM, and optional memory and so on) containing a computer-available program code.

The present disclosure is described by referring to flowcharts and/or block diagrams of the method, device (system), and computer program product according to the embodiments of the present disclosure. It shall be understood that each flow and/or block of flowcharts and/or block diagrams and a combination of flows and/or blocks of flowcharts and/or block diagrams can be implemented by computer program instructions. There computer program instructions can be provided to a general computer, a specific computer, an embedded processor or processors of other programmable data processing devices to generate a machine, so that an instruction executed by a computer or a processor of other programmable data processing device generates an apparatus configured to implement the functions specified in one flow or a plurality of flows of flowcharts and/or one block or a plurality of blocks of block diagrams.

These computer program instructions can also be stored in a computer readable memory being capable of booting a computer or other programmable data processing devices to operate in a particular way, so that the instruction stored in the computer readable memory comprises a manufacturer including an instruction apparatus. This instruction apparatus implements functions specific in one flow or a plurality of flows of flowcharts and/or one block or a plurality of blocks of block diagrams.

These computer program instructions can be loaded to a computer or other programmable data processing devices, so that a series of operation steps are executed on the computer or other programmable devices to generate processing implemented by the computer. Thus, the instructions executed on the computer or other programmable devices provide steps used for realizing the functions specific in one flow and/or a plurality of flows of flowcharts and/or block or a plurality of blocks of block diagrams.

In particular, computer program instructions corresponding to the information processing method in the embodiment of the present disclosure can be stored in storage medium such as optical disk, hardware and U disk and so on. When the computer program instructions in the storage medium corresponding to the information processing method is read or executed by an electronic device, following steps are performed: obtaining an operation performed by an operator on the electronic device, wherein the operation is capable of producing a force on the electronic device; detecting a parameter of the operation; controlling to deform the electronic device in response to the operation when the parameter satisfies a first condition; and generating a control instruction based on the operation when the parameter does not satisfy the first condition or satisfies a second condition, and at the same time, maintaining the electronic device to be not deformed or to be deformed in a degree lower than a preset threshold.

Optionally, when the computer program instructions, stored in the storage medium and corresponding to the step of generating a control instruction based on the operation when the parameter does not satisfy the first condition or satisfies a second condition, are executed, following step is in particular performed: generating the control instruction based on a pressure value produced by the operation on the electronic device when the parameter does not satisfy the first condition or satisfies the second condition.

Optionally, when the computer program instructions, stored in the storage medium and corresponding to the step of generating the control instruction based on a pressure value produced by the operation on the electronic device when the parameter does not satisfy the first condition or satisfies the second condition, are executed, following step is in particular performed: adjusting a function parameter of the electronic device based on the pressure value in response to the control instruction.

Optionally, when the computer program instructions, stored in the storage medium and corresponding to the step of detecting a parameter of the operation, are executed, following step is in particular performed: detecting a number of current force bearing points of the electronic device based on the operation.

Optionally, when the computer program instructions, stored in the storage medium and corresponding to the step of generating a control instruction based on the operation when the parameter does not satisfy the first condition or satisfies a second condition, are executed, following steps are in particular performed: determining that the parameter does not satisfy the first condition or satisfies the second condition when the number is only one; and generating the control instruction based on the operation.

Optionally, when the computer program instructions, stored in the storage medium and corresponding to the step of controlling to deform the electronic device in response to the operation when the parameter satisfies a first condition, are executed, following steps are in particular performed: determining that the parameter satisfies the first condition when the number is at least two; and controlling to deform the electronic device in response to the operation.

Optionally, when the computer program instructions, stored in the storage medium and corresponding to the step of detecting a parameter of the operation, are executed, following step is in particular performed: detecting a coordinate position of a current force bearing point of the electronic device based on the operation.

Optionally, when the computer program instructions, stored in the storage medium and corresponding to the step of controlling to deform the electronic device in response to the operation when the parameter satisfies a first condition, are executed, following steps are in particular performed: determining that the parameter satisfies the first condition when the number of the current force bearing points is at least two and the coordinate position satisfies a first preset condition; and controlling to deform the electronic device in response to the operation.

Optionally, when the computer program instructions, stored in the storage medium and corresponding to the step of detecting a parameter of the operation, are executed, following step is in particular performed: detecting a force bearing direction of a current force bearing point corresponding to the operation.

Optionally, when the computer program instructions, stored in the storage medium and corresponding to the step of generating a control instruction based on the operation when the parameter does not satisfy the first condition or satisfies a second condition, are executed, following steps are in particular performed: determining that the parameter does not satisfy the first condition or satisfies the second condition when the force bearing direction satisfies a second preset condition; and generating the control instruction based on the operation.

Optionally, when the computer program instructions, stored in the storage medium and corresponding to the step of determining that the parameter does not satisfy the first condition or satisfies the second condition when the force bearing direction satisfies a second preset condition, are executed, following step is in particular performed: determining that the parameter does not satisfy the first condition or satisfies the second condition when the force bearing direction is in particular a direction vertical to a force bearing surface of the electronic device.

Optionally, when the computer program instructions, stored in the storage medium and corresponding to the step of controlling to deform the electronic device in response to the operation when the parameter satisfies a first condition, are executed, following steps is in particular performed: determining that the parameter satisfies the first condition when an included angle between the force bearing direction and a preset direction is greater than a preset included angle; and controlling to deform the electronic device in response to the operation.

Optionally, when the computer program instructions, stored in the storage medium and corresponding to the step of detecting a parameter of the operation, are executed, following step is in particular performed: detecting the force bearing direction of the current force bearing point corresponding to the operation and the coordinate position of the current force bearing point corresponding to the operation.

Optionally, when the computer program instructions, stored in the storage medium and corresponding to the step of controlling to deform the electronic device in response to the operation when the parameter satisfies a first condition, are executed, following steps are in particular performed: determining that the parameter satisfies the first condition if the number of the current force bearing points is at least two and at least two directions of the force bearing directions are different; and controlling to deform the electronic device in response to the operation.

Optionally, when the computer program instructions, stored in the storage medium and corresponding to the step of detecting a parameter of the operation, are executed, following steps are in particular performed: determining a value range that a borne force at the current force bearing point corresponding to the operation falls into when the operation is acted on the electronic device; and determining a duration that the borne force falls into the value range.

Optionally, when the computer program instructions, stored in the storage medium and corresponding to the step of controlling to deform the electronic device in response to the operation when the parameter satisfies a first condition, are executed, following steps are in particular performed: determining that the parameter satisfies the first condition if the duration is greater than a first time threshold; and controlling to deform the electronic device in response to the operation.

Optionally, when the computer program instructions, stored in the storage medium and corresponding to the step of generating a control instruction based on the operation when the parameter does not satisfy the first condition or satisfies a second condition, are executed, following steps are in particular performed: determining that the parameter does not satisfy the first condition or satisfies the second condition if the duration is smaller than a second time threshold, wherein the second time threshold is not greater than the first time threshold; and generating the control instruction based on the operation.

Optionally, when the computer program instructions, stored in the storage medium and corresponding to the step of detecting a parameter of the operation, are executed, following step is in particular performed: detecting a value of the force acted by the operation on the electronic device.

Optionally, when the computer program instructions, stored in the storage medium and corresponding to the step of controlling to deform the electronic device in response to the operation when the parameter satisfies a first condition, are executed, following steps are in particular performed: determining that the parameter satisfies the first condition and controlling to deform the electronic device in response to the operation if the value is greater than a first preset value.

Optionally, when the computer program instructions, stored in the storage medium and corresponding to the step of generating a control instruction based on the operation when the parameter does not satisfy the first condition or satisfies a second condition, are executed, following steps are in particular performed: determining that the parameter does not satisfy the first condition or satisfies the second condition and generating the control instruction based on the operation if the value is greater than a second preset value and smaller than the first preset value.

Although preferable embodiments of the present disclosure are described, those skilled in the art can make additional alterations and amendments to these embodiments once they know basic inventive concepts. Therefore, the claims intend to be explained as including the preferable embodiments and all the alternations and amendments falling into the scope of the present disclosure.

Obviously, those skilled in the art can make various alternations and modifications to the present disclosure without departing from the spirit and scope. As such, if these amendments and modifications of the present disclosure belong to the scope of the claims and their equivalent technology, then the present disclosure intends to include these alternations and modifications.

The invention claimed is:

1. An information processing method applicable to a deformable electronic device comprising:

obtaining an operation performed by an operator on the electronic device, wherein the operation is capable of producing a force on the electronic device;

detecting a parameter of the operation;

deforming the electronic device in response to the operation when the parameter satisfies a first condition; and generating a control instruction based on a pressure value produced by the operation on the electronic device when the parameter does not satisfy the first condition or satisfies a second condition, and at the same time maintaining the electronic device to be not deformed or to be deformed in a degree lower than a preset threshold.

2. The method according to claim 1, wherein the generating the control instruction based on a pressure value produced by the operation on the electronic device when the parameter does not satisfy the first condition or satisfies the second condition comprises adjusting a function parameter of the electronic device based on the pressure value in response to the control instruction.

3. The method according to claim 1, wherein the detecting a parameter of the operation comprises detecting a number of current force bearing points of the electronic device based on the operation; and the generating a control instruction based on the operation when the parameter does not satisfy the first condition or satisfies a second condition comprises determining that the parameter does not satisfy the first condition or satisfies the second condition when the number is only one; and generating the control instruction based on the operation.

4. The method according to claim 1, wherein the detecting a parameter of the operation comprises detecting a number of current force bearing points of the electronic device based on the operation; and the deforming the electronic device in response to the operation when the parameter satisfies a first condition comprises determining that the parameter satisfies the first condition when the number of current force bearing points is at least two; and deforming the electronic device in response to the operation.

5. The method according to claim 4, wherein the detecting a parameter of the operation comprises detecting a coordinate position of a current force bearing point of the electronic device based on the operation; and the deforming the electronic device in response to the operation when the parameter satisfies a first condition comprises determining that the parameter satisfies the first condition when the number of the current force bearing points is at least two and the coordinate position satisfies a first preset condition; and deforming the electronic device in response to the operation.

6. The method according to claim 4, wherein the detecting a parameter of the operation comprises detecting a force bearing direction of the current force bearing point corresponding to the operation and a coordinate position of the current force bearing point; and the deforming the electronic device in response to the operation when the parameter satisfies a first condition comprises determining that the parameter satisfies the first condition if the number of the current force bearing points is at least two and at least two directions of the force bearing directions are different; and deforming the electronic device in response to the operation.

7. The method according to claim 1, wherein the generating a control instruction based on the operation when the parameter does not satisfy the first condition or satisfies a second condition comprises:

determining that the parameter does not satisfy the first condition or satisfies the second condition if a duration is smaller than a second time threshold, wherein the second time threshold is not greater than a first time threshold; and generating the control instruction based on the operation.

8. The method according to claim 1, wherein the detecting a parameter of the operation comprises detecting a force bearing direction of a current force bearing point corresponding to the operation; and the generating a control instruction based on the operation when the parameter does not satisfy the first condition or satisfies a second condition comprises determining that the parameter does not satisfy the first condition or satisfies the second condition when the force bearing direction satisfies a second preset condition; and generating the control instruction based on the operation.

9. The method according to claim 8, wherein the determining that the parameter does not satisfy the first condition or satisfies the second condition when the force bearing direction satisfies a second preset condition comprises determining that the parameter does not satisfy the first condition or satisfies the second condition when the force bearing direction is a direction vertical to a force bearing surface of the electronic device.

10. The method according to claim 1, wherein the detecting a parameter of the operation comprises detecting a force bearing direction of a current force bearing point corresponding to the operation; and the deforming the electronic device in response to the operation when the parameter satisfies a first condition comprises determining that the parameter satisfies the first condition when an included angle between the force bearing direction and a preset direction is greater than a preset included angle; and deforming the electronic device in response to the operation.

11. The method according to claim 1, wherein the detecting a parameter of the operation comprises determining a value range that a borne force at the number of current force bearing points corresponding to the operation falls into when the operation is acted on the electronic device; and determining a duration that the borne force falls into the value range; and the deforming the electronic device in response to the operation when the parameter satisfies a first condition comprises determining that the parameter satisfies the first condition if the duration is greater than a first time threshold; and deforming the electronic device in response to the operation.

12. The method according to claim 1, wherein the detecting a parameter of the operation comprises detecting a value of the force acted by the operation on the electronic device;

the deforming the electronic device in response to the operation when the parameter satisfies a first condition comprises determining that the parameter satisfies the first condition if the value is greater than a first preset value; and deforming the electronic device in response to the operation; and the generating a control instruction based on the operation when the parameter does not satisfy the first condition or satisfies a second condition comprises determining that the parameter does not satisfy the first condition or satisfies the second condition if the value is greater than a second preset value and smaller than the first preset value; and generating the control instruction based on the operation.

13. An electronic device, comprising:
a deformable display screen;
a processor connected to the deformable display screen, wherein the processor is configured to:
obtain an operation performed by an operator on the electronic device, wherein the operation is capable of producing a force on the electronic device;
detect a parameter of the operation;
control to deform the electronic device in response to the operation when the parameter satisfies a first condition; and
generate a control instruction based on a pressure value produced by the operation on the electronic device when the parameter does not satisfy the first condition or satisfies a second condition, and at the same time, maintain the electronic device to be not deformed or to be deformed in a degree lower than a preset threshold.

14. The electronic device according to claim 13, wherein the processor is configured to adjust a function parameter of the electronic device based on the pressure value.

15. The electronic device according to claim 13, wherein the processor is configured to determine that the parameter does not satisfy the first condition or satisfies the second condition when a detected number of current force bearing points is only one; and generate the control instruction based on the operation.

16. The electronic device according to claim 15, wherein the processor is configured to determine that the parameter satisfies the first condition when the number of current force bearing points is at least two; and control to deform the electronic device in response to the operation.

17. The electronic device according to claim 13, wherein the processor is configured to determine that the parameter satisfies the first condition when a detected number of the current force bearing points is at least two and detected coordinate positions satisfy the first preset condition; and control to deform the electronic device in response to the operation.

18. The electronic device according to claim 13, wherein the processor is configured to:
determine that the parameter does not satisfy the first condition or satisfies the second condition when a detected force bearing direction of the current force bearing point corresponding to the operation satisfies a second preset condition, and generate the control instruction based on the operation; or
determine that the parameter satisfies the first condition when an included angle between a detected force bearing direction of the current force bearing point corresponding to the operation and a preset direction is greater than a preset included angle, and control to deform the electronic device in response to the operation.

19. The electronic device according to claim 18, wherein the processor is configured to determine that the parameter does not satisfy the first condition or satisfies the second condition when the force bearing direction is a direction vertical to a force bearing surface of the electronic device.

20. An electronic device, comprising:
a first obtaining unit configured to obtain an operation performed by an operator on the electronic device, wherein the operation is capable of producing a force on the electronic device;
a first detecting unit configured to detect a parameter of the operation;
a first responding unit configured to deform the electronic device in response to the operation when the parameter satisfies a first condition; and
a first control unit configured to generate a control instruction based on the operation when the parameter does not satisfy the first condition or satisfies a second condition, and at the same time maintain the electronic device to be not deformed or to be deformed in a degree lower than a preset threshold.

\* \* \* \* \*